US008757448B2

(12) United States Patent
Aviram (10) Patent No.: US 8,757,448 B2
(45) Date of Patent: Jun. 24, 2014

(54) SYSTEM AND METHOD FOR LIQUID MEASURING DISPENSER

(71) Applicant: Yaniv Aviram, Kadima (IL)

(72) Inventor: Yaniv Aviram, Kadima (IL)

( * ) Notice: Subject to any disclaimer, the term of this patent is extended or adjusted under 35 U.S.C. 154(b) by 0 days.

(21) Appl. No.: 13/937,238

(22) Filed: Jul. 9, 2013

(65) Prior Publication Data

US 2013/0320046 A1 Dec. 5, 2013

Related U.S. Application Data

(62) Division of application No. 12/843,898, filed on Jul. 27, 2010, now Pat. No. 8,499,968.

(51) Int. Cl.
*B67D 7/56* (2010.01)

(52) U.S. Cl.
USPC ........... 222/157; 222/438; 222/448; 222/450; 222/456; 222/153.14; 222/1

(58) Field of Classification Search
USPC ............. 222/1, 109, 154–159, 163–164, 166, 222/168.5, 23, 519–525, 405, 434, 435, 222/438, 439, 448, 450, 454, 456
See application file for complete search history.

(56) References Cited

U.S. PATENT DOCUMENTS

| 3,304,965 | A | | 2/1967 | Tate |
| 4,286,573 | A | | 9/1981 | Nickel |
| 5,127,553 | A | | 7/1992 | Weinstein |
| 5,330,081 | A | * | 7/1994 | Davenport ..................... 222/207 |
| 5,522,378 | A | | 6/1996 | Riston et al. |
| 5,584,420 | A | * | 12/1996 | Awada et al. ............ 222/153.09 |
| 5,881,894 | A | | 3/1999 | Gargano |
| 6,164,498 | A | * | 12/2000 | Faughey et al. ................ 222/309 |
| 6,330,960 | B1 | * | 12/2001 | Faughey et al. ................ 222/205 |
| 6,394,317 | B1 | | 5/2002 | Faughey et al. |
| 6,435,378 | B1 | | 8/2002 | Aptekman |
| 7,111,760 | B2 | * | 9/2006 | Pagovich et al. .............. 222/158 |
| 7,156,258 | B2 | * | 1/2007 | Eckert ............................. 222/23 |
| 7,959,031 | B2 | * | 6/2011 | Ranney ............................ 222/1 |
| 2002/0070233 | A1 | * | 6/2002 | Angelos ......................... 222/109 |
| 2004/0173634 | A1 | | 9/2004 | Pagovich et al. |
| 2009/0001104 | A1 | * | 1/2009 | Ranney .......................... 222/438 |
| 2011/0240674 | A1 | | 10/2011 | Pai |
| 2012/0248138 | A1 | * | 10/2012 | Wollach ............................ 222/1 |

* cited by examiner

*Primary Examiner* — Frederick C Nicolas
*Assistant Examiner* — Bob Zadeh
(74) *Attorney, Agent, or Firm* — Mark M. Friedman

(57) ABSTRACT

A dispensing device for a fluid container, which includes a container cap, a switching nozzle, a securing mechanism and a dispensing compartment. The container cap has apertures, and the switching nozzle has a closing and an opening state. In the closing state the switching nozzle hermetically seals the apertures. An oval skirt is attached to the switching nozzle embracing the container cap, having protrusions for fixing the skirt to the container cap. Pressing the skirt releases the fixing and allows switching to an opening state. A setting mechanism determines the limited volume of the dispensing compartment and secures the volume from undesired variation. An annular portion has clefts and quantity markings. The setting mechanism encompasses the annular portion and has setting bumps bulging proximate to the annular portion, and barrel apertures. Upon mating the setting bumps with a cleft, a marking is exposed through the apertures.

5 Claims, 9 Drawing Sheets

SYSTEM AND METHOD FOR LIQUID MEASURING DISPENSER

PRIORITY INFORMATION

The present U.S. Patent Application is a divisional of U.S. patent application Ser. No. 12/843,898 filed on 27 Jul. 2010, filed by Applicant herein.

BACKGROUND OF THE INVENTION

1. Field of the Invention

The invention is in the field of medical equipment, and especially deals with a cap of a medicine fluid bottle enabling fixing the consumed dose as prescribed by a doctor and using the prescribed dose by a patient.

2. Description of Related Art

The present invention relates to a liquid measuring dispenser and, more particularly, to a measuring dispensing cap for measuring a desired and precise amount of liquid medicine. Liquid dispensers are commonly used in domestic situations such as adding a liquid detergent to a washing machine or a dishwasher, but are more commonly known for pouring of liquid medicine.

In taking liquid medicine it is desired to measure the quantity taken such that it fits the doctor's prescription. To this aim, people have measuring accessories like syringes, spoons and cups in their home. Nevertheless, pouring of liquid medicine often entails inaccuracy and spillage. In addition, children sometimes insist on taking the medicine themselves. Also, upon travelling the accessories may be forgotten, which makes taking the liquid medicine as prescribed almost impossible. Note that taking the prescribed medicine quantity is of utmost importance. Over 500,000 kids in US alone are hurt by taking overdosed medicine, a result of erroneous prescriptions, forgetting the right prescription, and using inappropriate measuring accessories. To overcome these drawbacks, it is provided a self-contained and accurate dispenser which can be integrated with the medicine bottle, without use of any additional accessories. Moreover, the desired device should have markings for the medicine quantity, thus allowing a user to have confidence in the quantity taken.

There are many types of pre-measured liquid dispensers existing in the prior art. Numerous patents describe various types of metering dispensing caps with various designs. Most common types of dispensers have separate storage and dispensing chambers. These dispensers are usually constructed of either rigid or deformable walls. Dispensers of deformable walls usually include a conduit tube enabling liquid to pass from the lower reservoir to the metered dispensing cap.

Alternatively, an inversion type dispenser relies on the force of gravity to transfer liquid from the storage chamber to the dispensing chamber.

U.S. Pat. No. 5,330,081 describes a portion measuring device having a first flexible reservoir capable of holding large volume, and a handle is provided to relieve operator fatigue. The second portion measuring reservoir has a rotatable closure with a pouring spout or opening. Applying pressure to the sidewalls of the first reservoir causes the sidewalls to flex and therefore causes fluid to travel up through the conduit tube to the second reservoir. Pressure is applied until the desired amount of fluid is in the cup-shaped reservoir. A pouring spout is provided so that the user may pour the fluid out of the cup-shaped reservoir.

U.S. Pat. No. 6,330,960 describes a flexible container for dispensing a precise dosage of liquids with a child-resistant cap. The container comprises an upper liquid reservoir and a lower liquid reservoir separated by a gasket. When applying pressure on the lower reservoir the contents of the container are forced up a longitudinal tube into the upper reservoir. When decreasing the pressure from container wall, liquid in the upper reservoir drains back to the lower reservoir until reaching the desired dosage. Once reaching the desired dosage, the bottle is inverted near a vertical position. In this position the lower end of the longitudinal tube is no longer submerged in liquid. Then, applying pressure on container wall forces the air into the tube such that sufficient pressure is developed in dispensing liquid out of the dispensing tip.

U.S. Pat. No. 5,584,420 describes a liquid dispenser for dispensing pre-measured quantities of liquid. The dispenser has a nozzle with an inlet end that attaches to a bottle, and an outlet end that engages with a tubular dispensing chamber. A removable outer cap is located at the top of the chamber to create a liquid tight seal. In the closed position, the nozzle is interlocked with the opening in the tubular dispensing chamber in order to prevent the flow of liquid from the bottle to the chamber. In order to allow liquid to pass from the bottle to the dispensing chamber, the tubular dispensing chamber is retracted from the nozzle in the upward direction. Once an opening occurs the bottle is inverted to allow liquid to fill the dispensing chamber. Once the chamber is filled, the chamber is pushed back down onto the nozzle to close the passage way, thus preventing liquid from draining back to the bottle. The metered liquid can be either stored at the dispensing chamber or the outer cap can be removed and the liquid can be dispensed.

While the prior art dispensers accomplish a means of dispensing a measured amount liquid, they withhold several drawbacks. Dispensers of flexible container of deformable walls require constant pressure in order to obtain the desired amount and therefore entail the user with fatigue and cumbersome that may result in inaccuracy. In addition, the dispenser described in U.S. Pat. No. 5,584,420 may result in a pre-measured amount of liquid by the means of inversion, but only disclose the means for dispensing a fixed amount of liquids and not an interchangeable amount. Furthermore, the mechanism of the dispenser is cumbersome, and does not provide a simple use. One can imagine the scenario where a person wakes up in the middle of the night, wishing to consume a given liquid medicine, and has to struggle by squeezing the dispenser and paying careful attention in order to obtain the precise amount of liquid. It is therefore the object of the present invention to overcome these disadvantages and to provide an easy, safe and accurate liquid dispenser that is simple for use, easy to manufacture and simple in structure.

BRIEF SUMMARY OF THE INVENTION

It is provided according to an embodiment of the current invention, a dispensing device for a fluid container. The dispensing device includes a container cap, a switching nozzle, a securing mechanism and a dispensing compartment. The container cap is associated with the container and has apertures. The switching nozzle has a closing state and an opening state, wherein in the closing state the switching nozzle hermetically sealing the apertures. The securing mechanism prevents undesired opening of apertures. The dispensing compartment is attached to the switching nozzle such that opening the apertures allows fluid flowing from the container to the dispensing compartment. The dispensing compartment has a limited volume for receiving the fluid. Also, a controlled outlet permits the fluid to flow out of the dispensing compartment.

In some embodiments, an oval skirt is attached to the switching nozzle embracing the container cap. The skirt has protrusions for fixing the skirt to the container cap at the closing state of the switching nozzle. Pressing certain opposite sides of the skirt releases the fixing and allows switching the switching nozzle to an opening state.

In some embodiments, the dispensing compartment is closed by a dispenser cap having a bulging portion limiting the volume available for receiving the fluid. Preferably, the dispenser cap has several removable portions, and the limited volume is determined by avoiding removing any removable portion or removing certain removable portions.

In some embodiments, the dispensing compartment includes an annular portion for receiving a fluid from the switching nozzle at the opening state, a setting mechanism, and a cover mechanism. The setting mechanism determines the limited volume of the dispensing compartment and secures the limited volume from undesired variation. The cover mechanism is associated with the setting mechanism for complete enclosing of the limited volume of the dispensing compartment. The cover mechanism includes a dispenser cap for preventing undesired flowing of fluid out of the dispensing compartment. Preferably, the cover mechanism has a child-proof safety mechanism.

In some embodiments, the annular portion has a plurality of structural deviations and a plurality of quantity markings associated with the structural deviations. The setting mechanism encompasses the annular portion and has setting bumps bulging proximate to the annular portion, and has barrel apertures. Upon mating the setting bumps with a structural deviation of the annular portion, a marking associated with the certain structural deviation is exposed though the apertures. Preferably, the annular portion has a plurality of clefts, and the setting bumps are able to be inserted in the clefts.

A maximal mating torque is exerted in mating a setting bump with a certain structural deviation of the annular portion. A minimal de-mating torque has to be exerted for cancelling an executed mating. Preferably, the maximal mating torque is substantially less than the minimal de-mating torque, thereby providing a child-proof safety from undesired variation of the determined limited volume.

It is provided a method for a person setting a volumetric dose on a fluid bottle. The method includes providing a fluid bottle having a fluid flowing mechanism for controlled flowing of fluid from the bottle, and a dispensing compartment for receiving a limited volumetric dose from the fluid bottle through the fluid flowing mechanism, setting the dispensing compartment for receiving a limited volumetric dose of the fluid, and securing the setting mechanism to prevent undesired variation of the limited volumetric dose.

The method may used by a pharmacy worker for setting a prescribed dose of a fluid medicine.

In some embodiments, the person sets the dispensing compartment for receiving a limited volumetric dose by moving coaxially one portion of the dispensing compartment relative to another portion thereof.

Preferably, the method includes the step of inserting setting bumps into clefts, thus exposing the respective markings through an aperture in the setting mechanism.

It is provided a method for delivering a predetermined volumetric dose of a fluid out of a bottle. The method includes receiving a fluid containing bottle having a fluid flowing mechanism controlled flowing of the fluid from the bottle, and a dispensing compartment adapted for receiving a predetermined volumetric dose from the fluid bottle through the fluid flowing mechanism. The method further includes switching the fluid flowing mechanism from a closing state to an opening state, pouring the fluid into the dispensing compartment up to the predetermined volumetric dose, switching the fluid flowing mechanism to the closing state, opening a cap of the dispensing compartment, and pouring the fluid in the dispensing compartment out of the dispensing compartment. In some embodiments, the method is used for consuming a prescribed volumetric dose of fluid medicine as determined by a pharmacy worker in accordance with a doctor prescription.

BRIEF DESCRIPTION OF THE DRAWINGS

The subject matter regarded as the invention is particularly pointed out and distinctly claimed in the concluding portion of the specification. The invention, however, both as to system organization and method of operation, together with features and advantages thereof, may best be understood by reference to the following detailed description when read with the accompanied drawings in which:

DETAILED DESCRIPTION OF THE INVENTION

The present invention will now be described in terms of specific example embodiments. It is to be understood that the invention is not limited to the example embodiments disclosed. It should also be understood that not every feature of the methods and systems handling the described device is necessary to implement the invention as claimed in any particular one of the appended claims. Various elements and features of devices are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

Several embodiments of the current invention are described in reference to FIGS. 1-12.

Figure 2A:
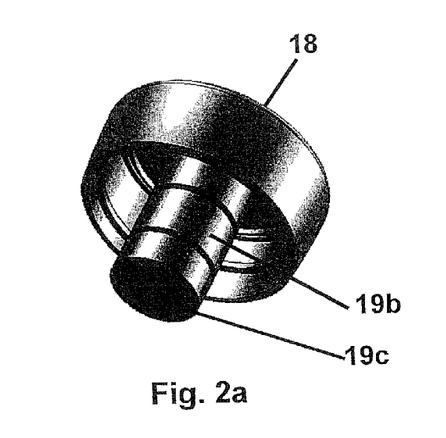
FIG. 2a is a perspective view of a cover mechanism.
Figure 2B:
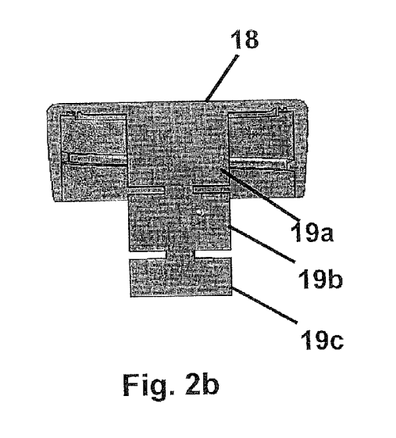
FIG. 2b is a sectional view of the cover mechanism.
Figures 3A, 3B:
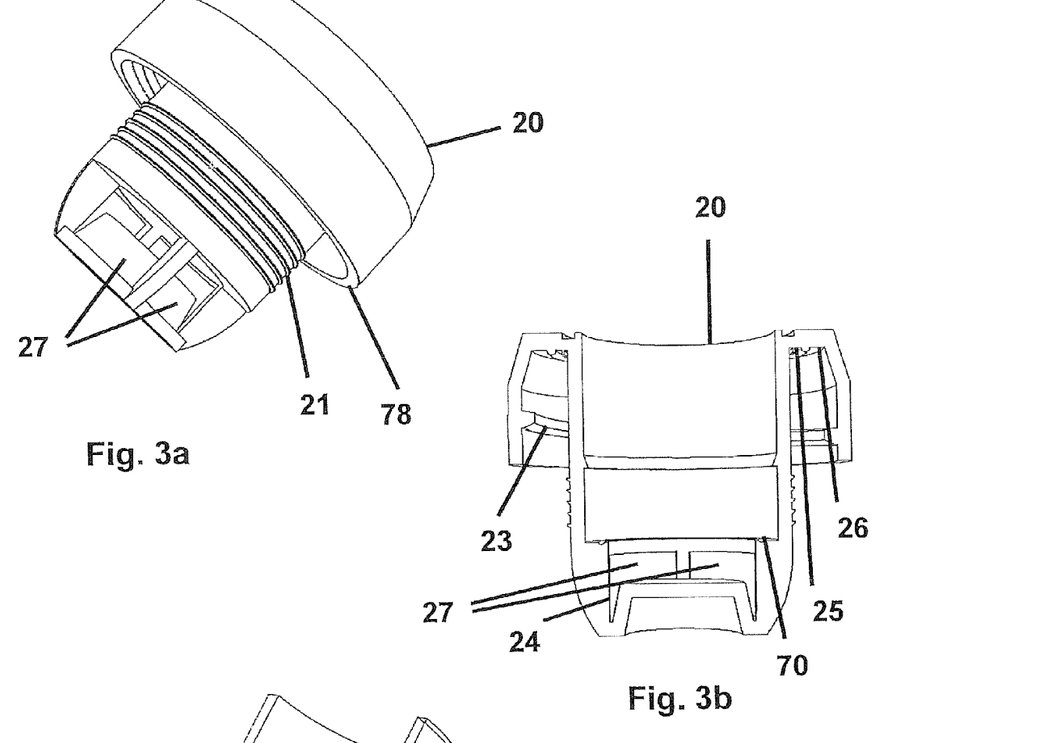
FIG. 3a is a perspective view of a container cap of the dispensing device.
FIG. 3b is a sectional view of the container cap.
Figure 3C:
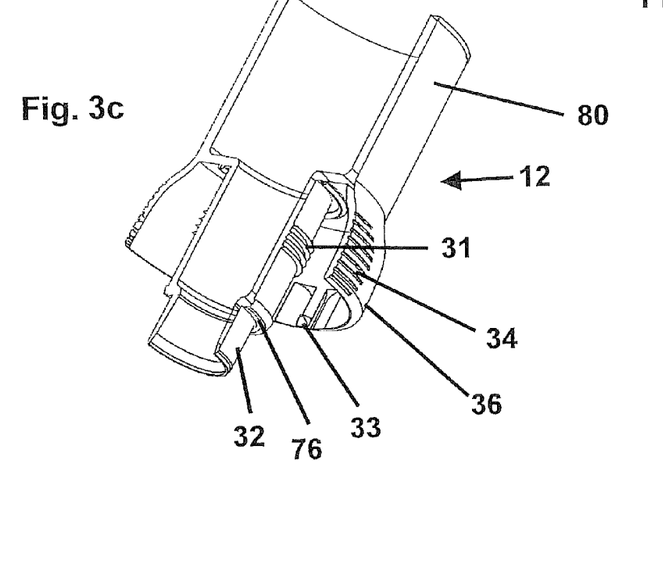
FIG. 3c is a sectional view of a central element of the dispensing device.

A First Embodiment with a Dispenser Cap Having Removable Portions (FIGS. 1-3)

Figure 1A:
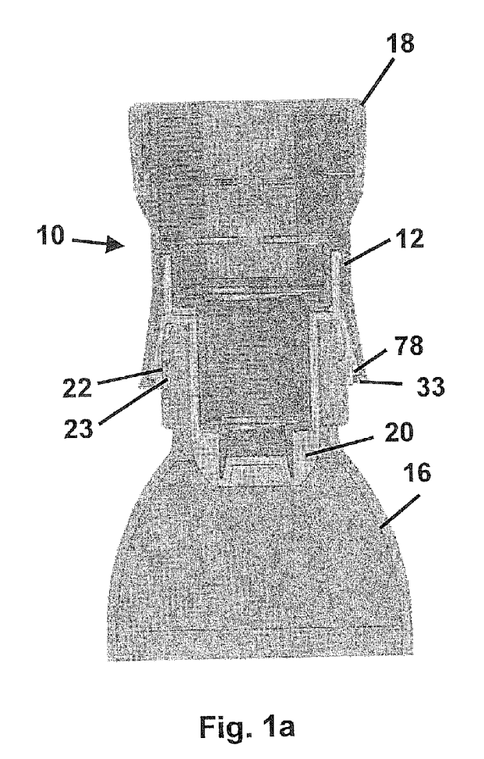
FIG. 1a is a sectional view of a dispensing device in a closing state according to a first embodiment of the current invention.
Figure 1B:
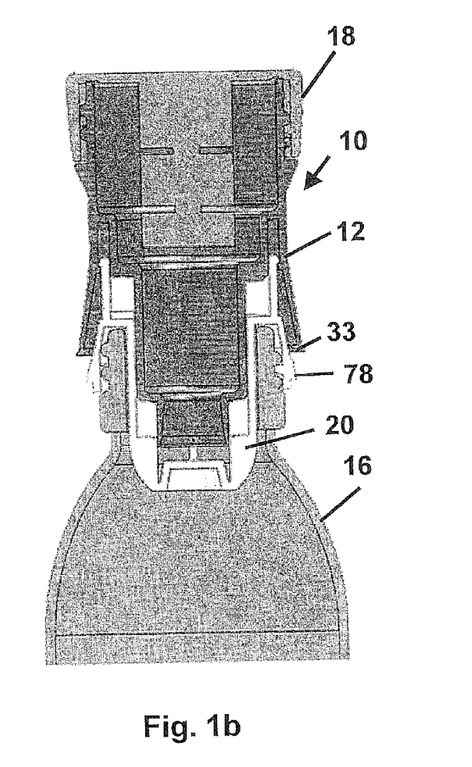
FIG. 1b is a sectional view of a dispensing device in an opening state.

Referring to FIG. 1a and FIG. 1b, a dispensing device 10 is attached to a bottle 16 which contains a fluid, a liquid medicine for example. Dispensing device 10 includes a container cap 20, presented also in FIGS. 3a and 3b, a central element 12, presented also in FIG. 3c, and a dispenser cap 18, presented also in FIGS. 2a and 2b. Container cap 20 is either integral part of bottle 16, or is attached to bottle 16, as shown in FIGS. 1a and 1b, where container cap 20 is engaged through threads 23 with bottle threads 22 to create a tight communication between bottle 16 and cap 20. O-rings 25 and 26 seal container cap 20 to an edge of bottle 16.

Functionally speaking, dispensing device 10 includes a switching nozzle secured by a child-proof securing mechanism, and a dispensing compartment. The switching nozzle includes apertures 27 of container cap 20 and a nozzle 32 of central element 12. The switching nozzle has a closing state shown in FIG. 1a and an opening state shown in FIG. 1b. In the closing state nozzle 32 enters a converging space 24 of cap 20, hermetically sealing apertures 27. Furthermore, sealing rings 31 prevent fluid leaking in between the internal wall of container cap 20 and the external wall of nozzle 32.

The closing state is secured by a securing mechanism based on two bumps 33 on a skirt 36 of central element 12, which are disposed under an edge 78 of container cap 20, preventing undesired opening of apertures 27. FIG. 1b exhibits the dispensing device in the opening state. Bump 33 slides on the outer wall of container cap 20, nozzle 32 stops to block apertures 27, and once a user deflects bottle 16, fluid from bottle 16 flows by gravitation through nozzle 32 to annular portion 80, filling the dispensing compartment up to the limited volume. The action of releasing bumps 33 of edge 78 is elaborated below.

The dispensing compartment is defined by container cap 20 on the bottom side, by dispenser cap 18 in the upper side, and by nozzle 32 and annular portion 80 in between as a cylindrical envelop.

Dispenser cap 18 has a bulging portion comprising cylindrical portion 19a, and removable cylinders 19b and 19c, which together decrease the volume of the dispensing compartment available for receiving the fluid, thus providing a limited fluid volume. The limited volume is determined by avoiding removing any removable cylinder, by breaking and removing only cylinder 19c or by breaking and removing both cylinders 19c and 19b. These options may fit, respectively, limited volumes of 5, 10 and 15 ml, for example. Preferably, the volume is changeable in the range 4 to 18 ml, for a medicine.

The emission of fluid from the dispensing compartment is made possible by rotating dispenser cap 20, removing it, and pouring the medicine to a cup or directly into a patient mouth.

A Second Embodiment with a Setting Mechanism (FIGS. 4-9)

FIGS. 4-9 illustrate a second embodiment of a dispensing device 14, whereas container cap 20 is the same as in the first embodiment, and a lower portion of a central element 30 is similar to a lower portion of central element 12. In contrast, the dispensing compartment of the dispensing device 14 differs appreciably from the dispensing compartment of dispensing device 10.

Figures 4A, 4B:
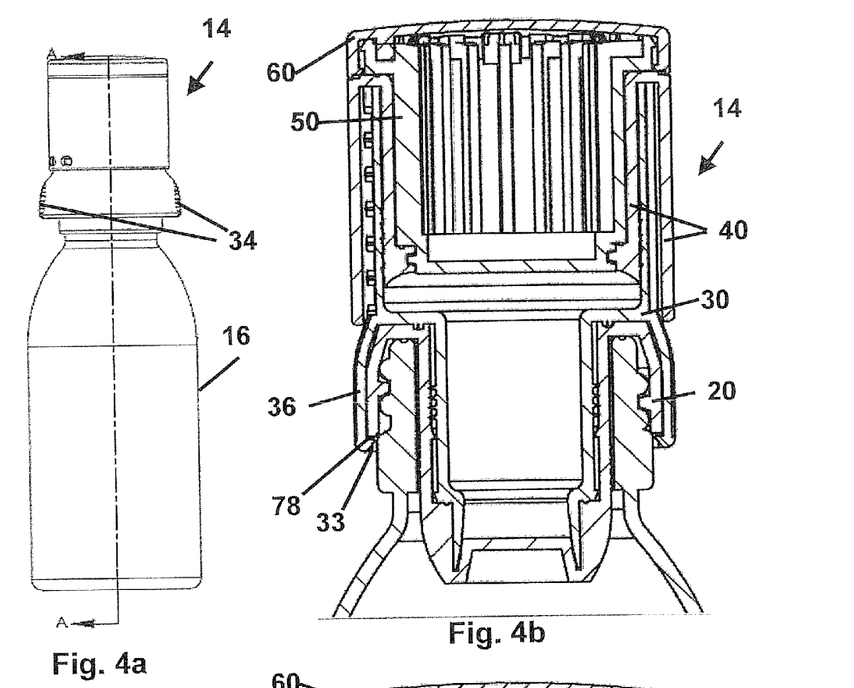
FIG. 4a is a front perspective view of a dispensing device attached to a bottle according to a second embodiment of the current invention.
FIG. 4b is an enlarged sectional view A-A of the dispensing device.
Figures 4C, 4D:
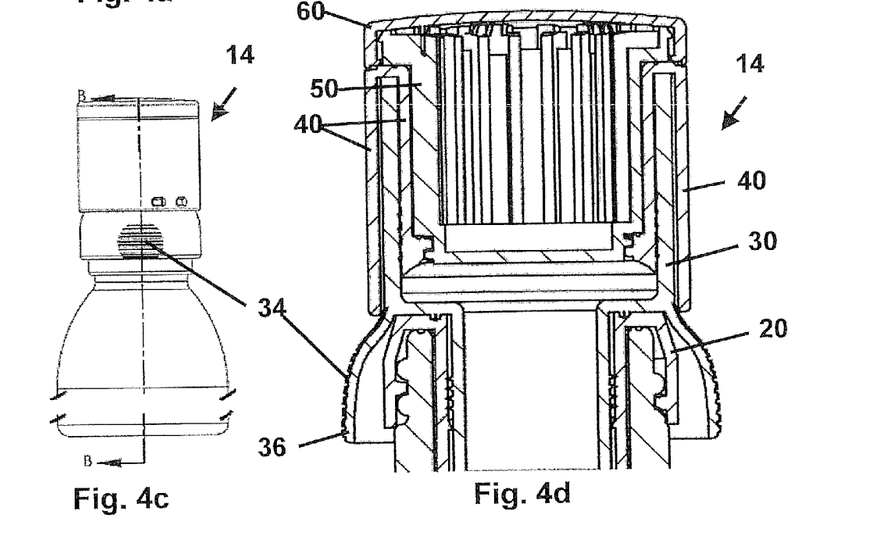
FIG. 4c is a side perspective view of the dispensing device attached to a bottle.
FIG. 4d is an enlarged sectional view B-B of the dispensing device.
Figures 5A, 5B:
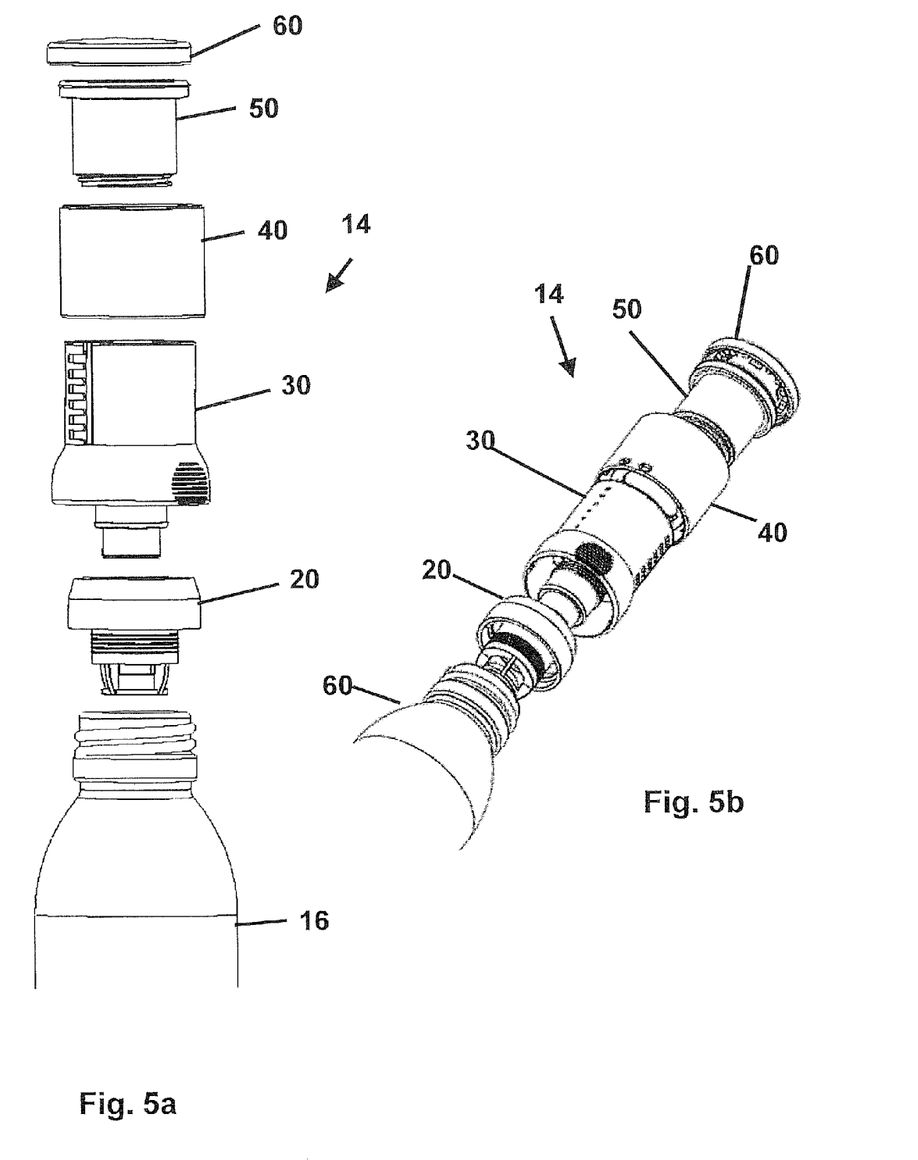
FIG. 5a is a front exploded view of the dispensing device.
FIG. 5b is a bottom exploded perspective view of the dispensing device.
Figure 6A:
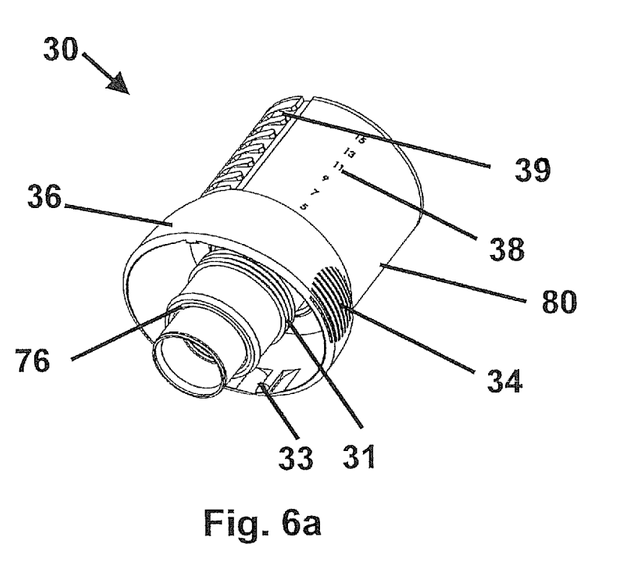
FIG. 6a is a bottom perspective view of a central element of the dispensing device.
Figure 6B:
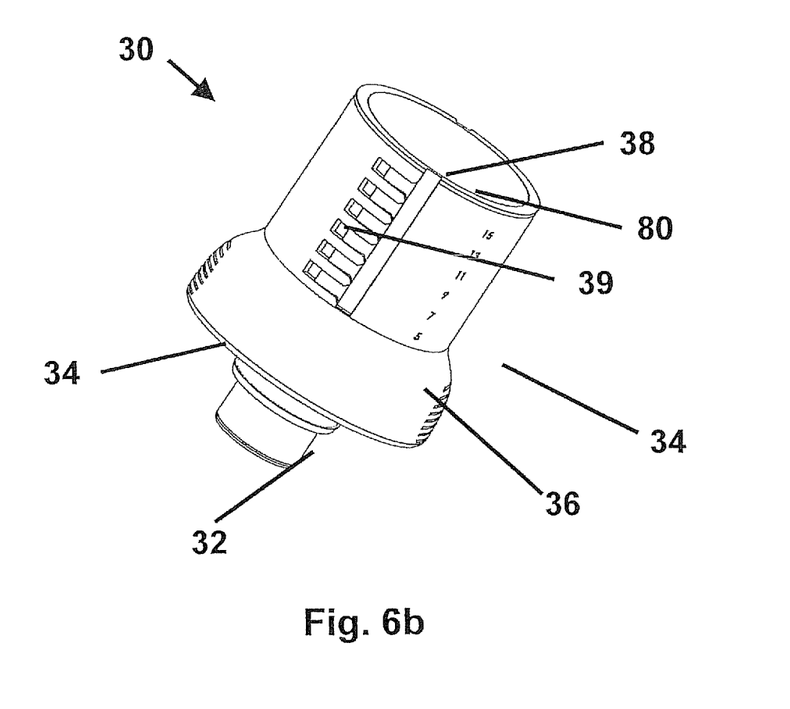
FIG. 6b is an upper perspective view of the central element.

Before discussing the different features of dispensing device 14, the release mechanism of the closing state of the switching nozzle is explained with reference to oval skirt 36 as presented in FIGS. 4a, 4b, 4c and 4d. FIG. 4a shows skirt 36 in a wide front perspective view wherein two pressing elements 34 are seen. Sectional view A-A of FIG. 4b shows bump 33 under edge 78 keeping the switching nozzle fixed in the closing state. Narrow front perspective view of skirt 36 is shown in FIG. 4c. In addition, FIG. 4d presents sectional view B-B of dispensing device 14, showing the wide side of skirt 36 further apart from dispenser cap 20. Once a user presses opposing elements 34 towards dispenser cap 20, bumps 33 move away from edge 78, allowing the user to slide central element 30 upwards, establishing an opening state of the switching nozzle.

Dispensing device 14 further includes a setting mechanism 40, a cover mechanism 50, and a dispenser cap 60. These parts are shown in an integrated operational mode in FIGS. 4b and 4c, totally separated in the front exploded perspective view of FIG. 5a, and slightly overlapping in the bottom exploded perspective view of FIG. 5b. The dispensing compartment of dispensing device 14 includes container cap 20, nozzle 32 and an annular portion 80 of central element 30, setting mechanism 40, and cover mechanism 50.

Referring now to FIGS. 6a, 6b, 7a and 7c, setting mechanism 40 determines the limited volume of the dispensing compartment and secures the limited volume from undesired variation. To this aim, annular portion 80 (FIGS. 6a, 6b) has a plurality of structural deviations or clefts 39 and a plurality of quantity markings 38 associated with clefts 39. Setting mechanism 40 includes two coaxial cylinders, an external cylinder 84 and an internal cylinder 86 bridged by a connecting ring 90. External cylinder 84 encompasses annular portion 80, has setting bumps 44 bulging proximate to the annular portion, and has barrel apertures 42 and 43 for exhibiting markings 38 of central element 30. Cover mechanism 50 is disposed within internal cylinder 86 as further elaborated below. To determine the volume available for receiving a fluid in the dispensing compartment, setting mechanism 40 slides coaxially along annular portion 80, wherein a pharmacist sees through aperture 43 a corresponding marking 38 and thus knows where to fix setting mechanism 40 relative to annular portion 80. For fixing limited volume, the pharmacist rotates setting mechanism 40 such that bumps 44 mate within a cleft 39. Upon mating, corresponding marking 38 associated with cleft 39 is exposed through aperture 42.

Figure 7A:
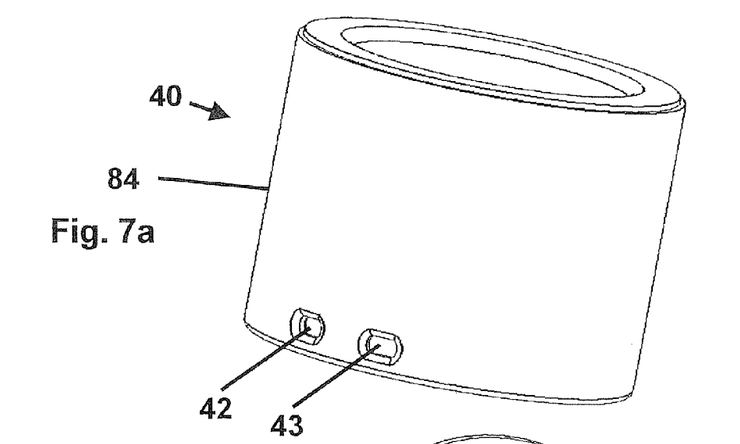
FIG. 7a is a first perspective view of a setting mechanism of the dispensing device.

Depending on the way setting bump 44 mates with cleft 39, a maximal mating torque is exerted in mating. In some embodiments, the mating is irreversible action, and de-mating is not possible without breaking device 14. In other embodiments, a minimal de-mating torque has to be exerted for cancelling an executed mating. Preferably, the maximal mating torque is substantially less than the minimal de-mating torque, by a factor of 5-10 for example. Thus, a child-proof safety is provided from undesired variation of the determined limited volume.

Figure 7B:
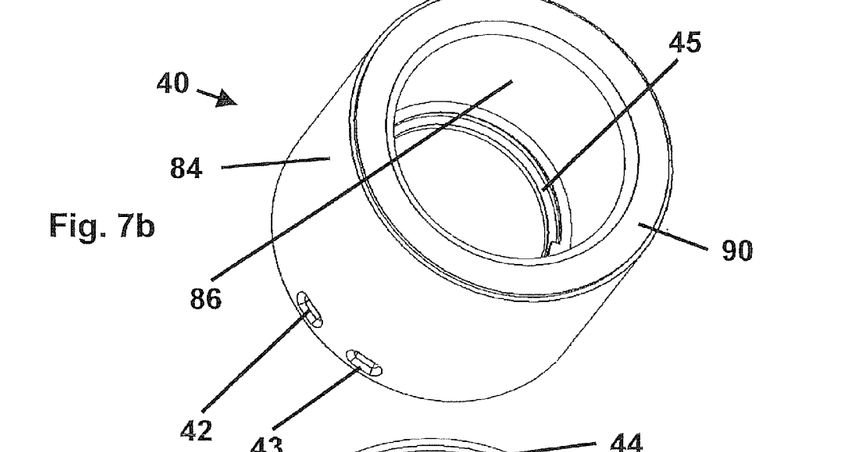
FIG. 7b is a second perspective view of the setting mechanism.
Figure 7C:
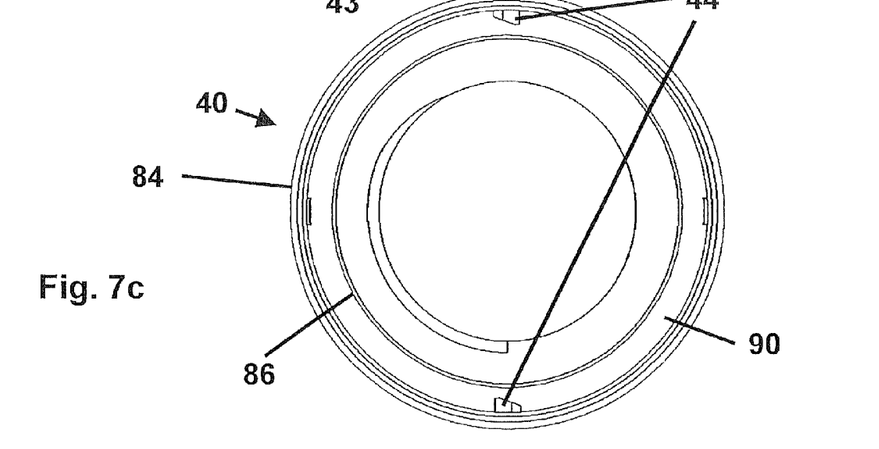
FIG. 7c is a bottom view of the setting mechanism.
Figures 8A, 8B:
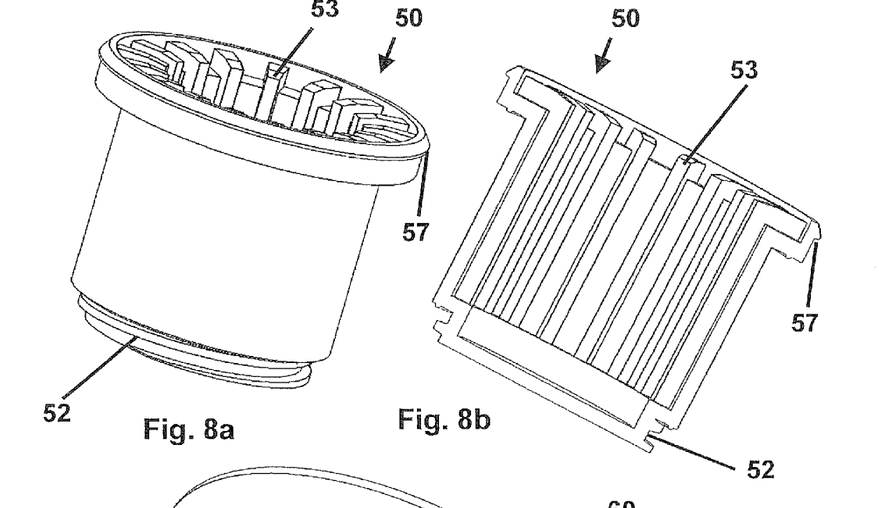
FIG. 8a is a perspective view of a cover mechanism of the dispensing device.
FIG. 8b is a sectional view of the cover mechanism.
Figure 9A:
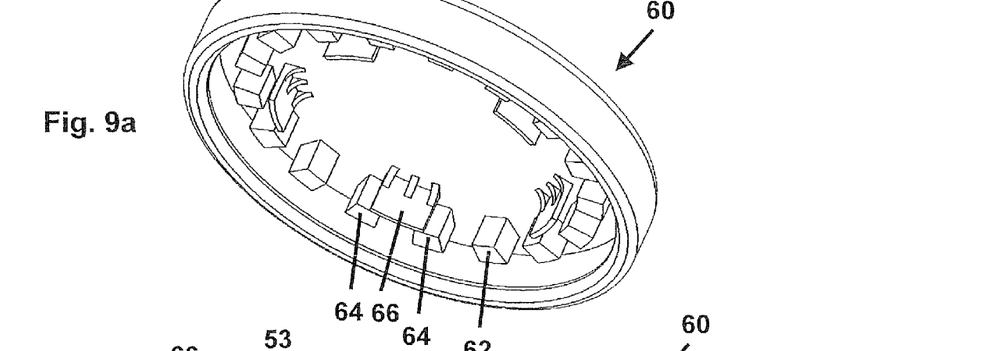
FIG. 9a is bottom perspective view of a safety cap of the dispensing device.
Figure 9B:
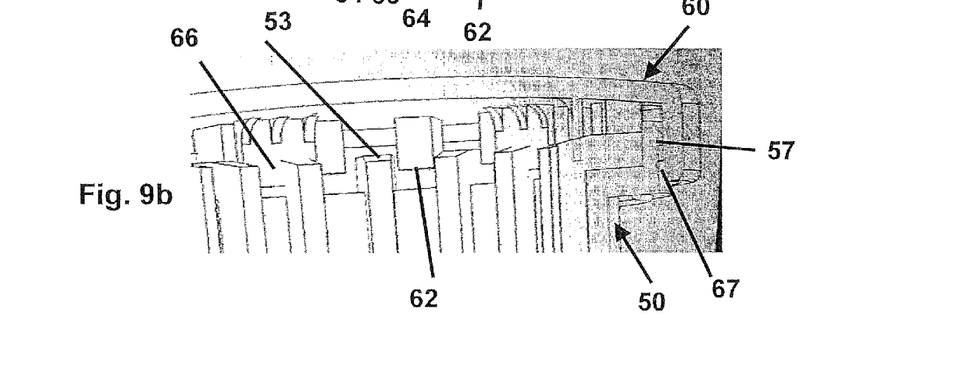
FIG. 9b is sectional view of the safety cap with the cover mechanism while integrated for opening the cover mechanism.

Referring now to FIGS. 8a and 8b, cover mechanism 50 has threads 52 for engaging with threads 45 of setting mechanism 40 (FIG. 7b). Thus, cover mechanism 50 sits within setting mechanism 40 and constitutes part of an enclosing defining the dispensing compartment of device 14. Several ribs 53 are disposed on the internal wall of cover mechanism 50, extending parallel to its axis from almost a bottom aperture to an upper aperture. FIGS. 9a and 9b show that a bulging small edge 57 allows coupling of dispenser cap 60 by pressing cap 60 to cover mechanism 50 such that an inwardly projected edge 67 of the dispenser cap 60 slides over edge 57 and locks cap 60 to cover mechanism 50. Yet, cap 60 is free to rotate slightly, at least around cover mechanism 50.

Dispenser cap 60 has a series of projections 62 and 64 inwardly extending from the internal side of dispenser cap 60. Pairs of projections 64 are bridged by a flat flexible element 66. Projections 62 and 64 are slightly above ribs 53, and therefore merely rotating dispenser cap 60 does not cause rotating and opening of cover mechanism 50. However, pressing the cap 60 towards cover mechanism 50 while rotating it slightly squeezes flexible elements 66 and enables engagement of projections 62 and 64 with ribs 53. Thus, cover mechanism 50 rotates with cap 60 until cover mechanism 50 disengages from setting mechanism 40, and is removed from the dispensing compartment, allowing emission of the fluid out of the dispensing compartment by appropriate deflection of the bottle.

Figure 10:
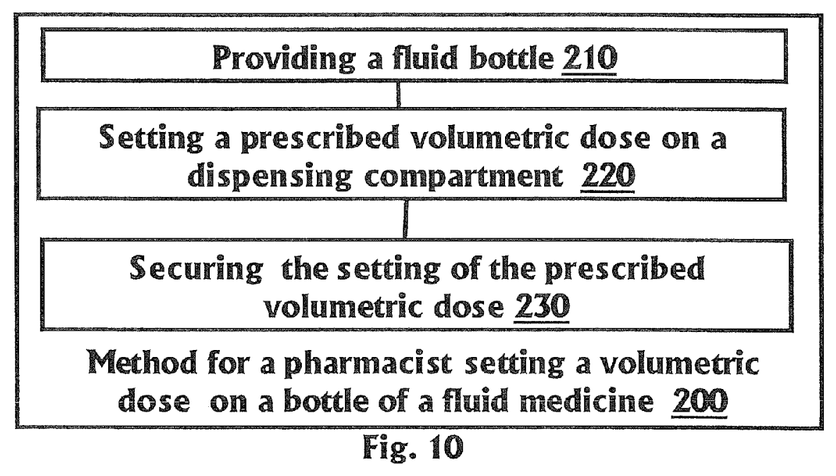
FIG. 10 is a flow chart of a method for a pharmacist setting a volumetric dose on a bottle of a fluid medicine.
Figure 11:
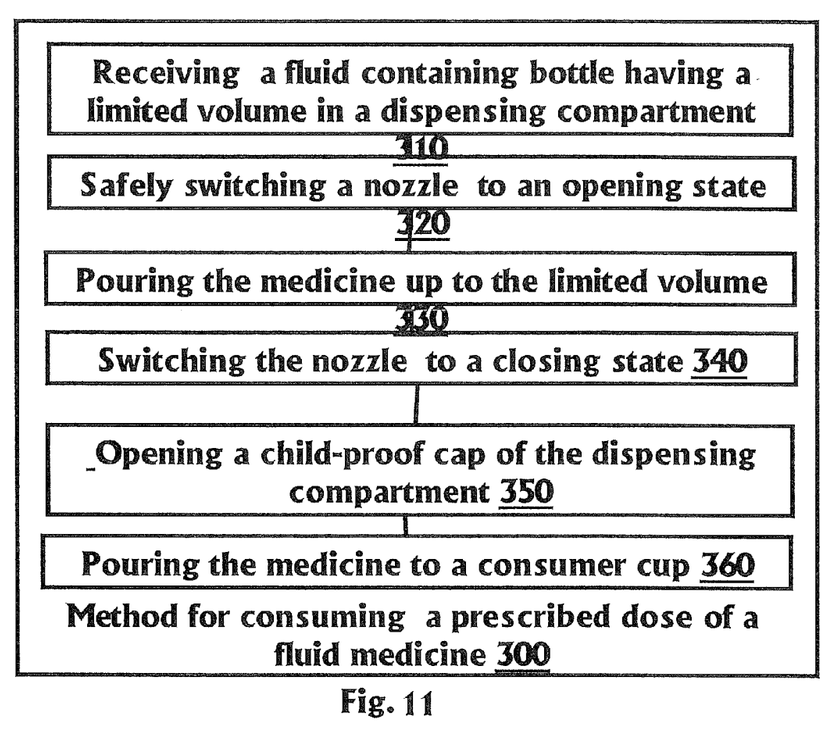
FIG. 11 is a flow chart of a method of consuming a prescribed dose of a fluid medicine.

Method Embodiments (FIGS. 10-11)

FIG. 10 is a flow chart of a method 200 for a pharmacist setting a prescribed volumetric dose on a fluid medicine bottle 16. Method 200 includes a step 210 of providing a fluid bottle 16 having a fluid flowing mechanism for controlled flowing of fluid from bottle 16, and a dispensing compartment for receiving a limited volumetric dose from fluid bottle 16 through the fluid flowing mechanism, a step 220 of setting the dispensing compartment for receiving a limited volumetric dose of the fluid, and a step 230 of securing the setting mechanism to prevent undesired variation of the limited volumetric dose.

In some embodiments, the pharmacist sets the dispensing compartment for receiving a limited volumetric dose by moving coaxially one portion of the dispensing compartment relative to another portion thereof.

Preferably, the dispensing compartment includes an annular portion 80 for receiving the fluid, and a setting mechanism 40. Annular portion 80 has a plurality of clefts 39 and a plurality of quantity markings 38 associated with clefts 39. Setting mechanism 40 encompasses annular portion 80 and has setting bumps 44 bulging proximate to annular portion 80. Method 200 includes the step of inserting setting bumps 44 into clefts 39, thus exposing the respective markings 38 through an aperture 43 in setting mechanism 40.

FIG. 11 is a flow chart of a method 300 for delivering a predetermined volumetric dose of a medicine fluid out of a bottle 16. preferably, method 300 is used for consuming a prescribed volumetric dose of fluid medicine as determined by a pharmacy worker in accordance with a doctor prescription.

Method 300 includes a step 310 of receiving a medicine bottle 16 having a fluid flowing mechanism for controlled flowing of the fluid from bottle 16, and a dispensing compartment adapted for receiving a predetermined volumetric dose from bottle 16 through the fluid flowing mechanism. Method 300 further includes a step 320 of safely switching the fluid flowing mechanism from a closing state to an opening state, a step 330 of pouring the medicine into the dispensing compartment up to the predetermined volumetric dose, a step 340 of switching the fluid flowing mechanism to the closing state, a step 350 of opening a cap of the dispensing compartment, and a step 360 of pouring the medicine from the dispensing compartment, preferably to a cup or to a patient mouth. In some embodiment, there is a special cap for babies through which a baby gets the medicine, preferably there is an option to choose either a baby cap or an adult cap. Also, a patient may drink the medicine directly from the bottle.

Figure 12:
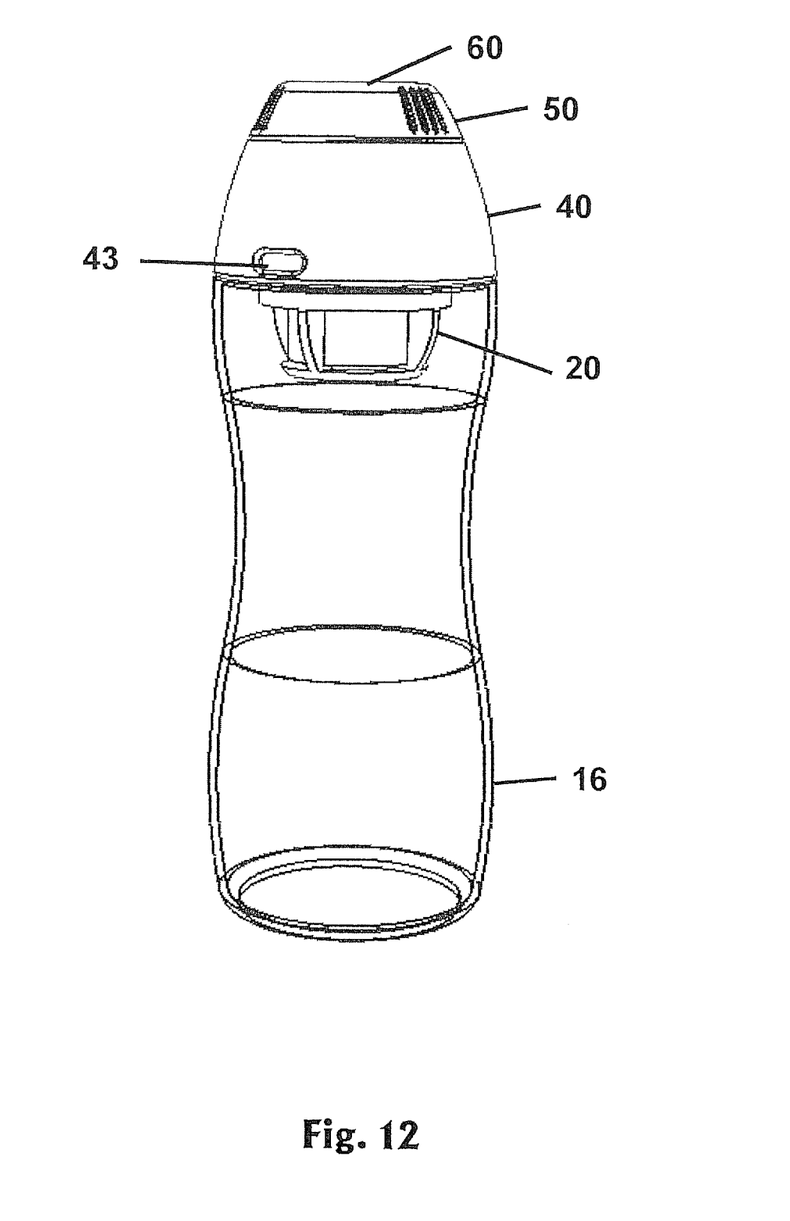
FIG. 12 is front perspective view of an exemplary bottle having integrated container cap and dispensing device according to a third embodiment.

An Integrated Bottle Embodiment (FIG. 12)

FIG. 12 is a front perspective view of a bottle 16 having integrated container cap 20 and dispensing device according to a third embodiment. Container cap 20 is manufactured in one piece with bottle 16, decreasing production cost and decreasing overall height of the bottle and dispensing device. The central element 30 is hidden by setting element 40, and only marking 38 may be seen through aperture 42 or 43. The external lines of all parts are shaped such that they are integrated as a single continuous line, which in the example shown in FIG. 12 is a curved line. The achieved design is both esthetic and practical as it helps the user to hold the bottle.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In particular, the present invention is not limited in any way by the examples described.

The invention claimed is:

1. A dispensing device for a fluid container, the dispensing device comprising:
    (a) a container cap associated with the container, said container cap having at least one aperture;
    (b) a switching nozzle having a closing state and an opening state, in said closing state said switching nozzle hermetically sealing said at least one aperture;
    (c) a securing mechanism adapted for preventing undesired opening of said at least one aperture;
    (d) a dispensing compartment attached to said switching nozzle and having an annular portion such that opening said at least one aperture allowing fluid flowing from the container to said dispensing compartment, said dispensing compartment having limited volume for receiving the fluid;
    (e) a setting mechanism adapted for:
        (I) determining said limited volume of said dispensing compartment; and (II) securing said limited volume from undesired variation;
(f) a cover mechanism associated with said setting mechanism for enclosing of said limited volume;
(g) said annular portion has a plurality of first structural deviations and a plurality of quantity markings associated with the plurality of the first structural deviations; and
(h) said setting mechanism encompasses said annular portion and has:
  (A) at least one setting bump bulging proximate to said annular portion; and
  (B) at least one barrel aperture;
  whereby upon mating said at least one setting bump with a certain first structural deviation of said annular portion, a marking associated with said certain first structural deviation is exposed though said at least one barrel aperture.

2. The dispensing mechanism of claim 1 wherein said annular portion has a plurality of clefts, and said at least one setting bump is able to be inserted in a cleft.

3. A dispensing device for a fluid container, the dispensing device comprising:
(a) a container cap associated with the container, said container cap having at least one aperture;
(b) a switching nozzle having a closing state and an opening state, in said closing state said switching nozzle hermetically sealing said at least one aperture;
(c) a securing mechanism adapted for preventing undesired opening of said at least one aperture;
(d) a dispensing compartment attached to said switching nozzle and having an annular portion such that opening said at least one aperture allowing fluid flowing from the container to said dispensing compartment, said dispensing compartment having limited volume for receiving the fluid;
(e) a setting mechanism adapted for:
  (I) determining said limited volume of said dispensing compartment; and
  (II) securing said limited volume from undesired variation;
(f) a cover mechanism associated with said setting mechanism for enclosing of said limited volume;
(g) said annular portion has a plurality of first structural deviations and a plurality of quantity markings associated with the plurality of the first structural deviations; and
(h) a maximal mating torque is exerted in mating said at least one setting bump with a certain first structural deviation of said annular portion, and a minimal de-mating torque has to be exerted for cancelling an executed mating, said maximal mating torque is substantially less than said minimal de-mating torque, thereby providing at least a child-proof safety from undesired variation of the determined limited volume.

4. The dispensing mechanism of claim 3 wherein the ratio of said minimal de-mating torque to said maximal mating torque is between 5 and 10.

5. A method for a person setting a volumetric dose on a fluid bottle, the method comprising:
(a) providing a fluid bottle having:
  (i) a fluid flowing mechanism adapted for controlled flowing of fluid from the bottle;
  (ii) a dispensing compartment adapted for receiving a limited volumetric dose from said fluid bottle through said fluid flowing mechanism; and
  (iii) said dispensing compartment includes an annular portion for receiving the fluid, and a setting mechanism, said annular portion has a plurality of clefts and a plurality of quantity markings associated with the clefts, said setting mechanism encompassing said annular portion and having at least one setting bump bulging proximate to said annular portion;
(b) setting the dispensing compartment for receiving a limited volumetric dose of the fluid;
(c) securing said setting mechanism; and
(d) inserting said at least one setting bump into at least one cleft, thus exposing at least one of said markings through an aperture in said setting mechanism, and preventing undesired variation of said limited volumetric dose.

* * * * *